July 8, 1969    A. A. ALBANESE ETAL    3,454,337
APPARATUS FOR DETERMINING THE NUMBER OF WHITE
CELLS IN A BLOOD SPECIMEN
Filed May 12, 1966
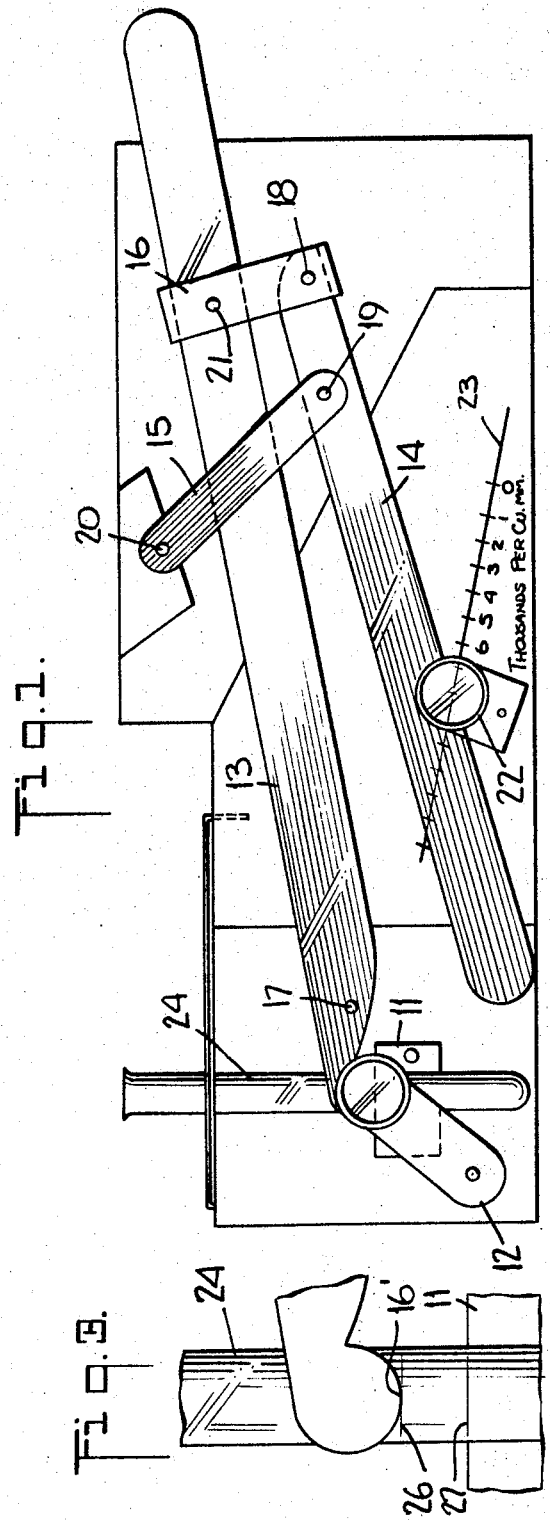
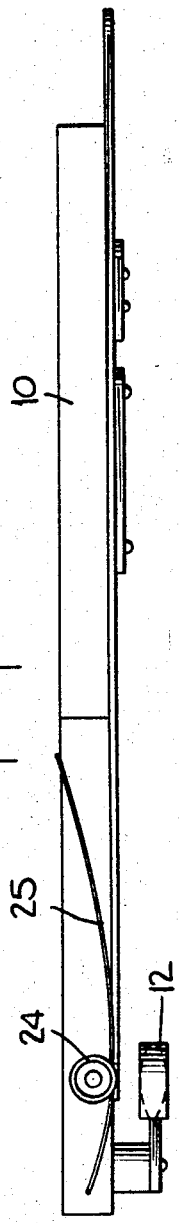
INVENTORS
ANTHONY A. ALBANESE
BY EVELYN H. WEIN
Kenyon & Kenyon
ATTORNEYS

United States Patent Office 3,454,337
Patented July 8, 1969

1

3,454,337
APPARATUS FOR DETERMINING THE NUMBER OF WHITE CELLS IN A BLOOD SPECIMEN
Anthony A. Albanese, 90 Harrison Ave., Harrison, N.Y. 10528, and Evelyn H. Wein, 42 Browndale Place, Port Chester, N.Y. 10573
Filed May 12, 1966, Ser. No. 549,727
Int. Cl. G01n 1/00, 33/16
U.S. Cl. 356—36                                     2 Claims

ABSTRACT OF THE DISCLOSURE

This invention relates to a novel device for measuring the number of white cells present in a specimen of blood.

It comprises means for receiving a blood sample in a column of predetermined transverse area and volume, in which the white cells have been separated into a layer; means for measuring the thickness of the separated white cell layer and a device for multiplying this measured thickness. This device comprises a linkage assembly which multiplies the measured thickness and translates the multiplied measured thickness into a number of cells per unit volume. This latter determination is carried out by a linkage assembly and a scale which is calibrated to indicate at the intersection of the linkage assembly and the scale the number of cells per unit of volume.

---

In medicine it becomes important for diagnostic purposes in treating certain diseases to know the "white cell blood count" of an individual i.e. the number of white cells present within a blood sample taken from the individual. Usually this measurement is made in terms of thousands of white cells per millimeter.

The prior art method of taking a white blood count requires the medical technican to obtain in a clean and dry pipet a predetermined and precise amount of blood. The sample is then diluted with an acid to another predetermined volume. After sufficient mixing of the acid and the blood sample, two to three drops of the mixture are expelled and a single drop of the fluid is placed under a cover glass on a counting chamber. A period of time is then allowed for the cells to settle, usually about 3 minutes. Thereupon the technician physically counts the actual number of cells present within the counting chamber, multiplies the number of white cells counted within the physical sample by a predetermined factor necessary to transform the single drop sample into the desired count per unit volume and thereby obtains the number of cells per unit of volume.

The above described method, involving several intricate and involved steps can lead to errors in the determination of the final count. These errors arise not only from the intricacies of the procedure but from the small quantities of blood involved and the even smaller percentage of white cells present within the blood sample. For example in any given blood sample under normal conditions the white cells physically constitute no more than ½ to 1% of the total volume.

From the above description it can be seen that a wet pipet can dilute the sample sufficiently to produce an inaccurate count. Similarly inaccuracies in measuring, mixing or removing blood, acid or the mixed sample; faulty removal of the sample from the pipet; faulty acid solution; inaccurate filling of the counting chamber; calculation errors; counting errors and myriad other possible problems introduce large errors in the final determination of the white cell count.

It is also known that in various diseases the number of white cells can increase at a very high rate. Thus they may double or triple in certain situations. Similarly in other diseases they are known to decrease to ½ or more of their normal number. This increase in actual cells however makes an insignificant increase in the percentage of the total sample occupied by the white cells. This occurs since the white cells are only ½ to 1% of the total blood content under a normal situation. Thus not only because of the insignificant percentage of the white cells but the non-linearity of the percent increase in the white cells in comparison to the total sample, the prior art devices used to measure the red cell count, based as they are upon the relative constancy and linear percent which the red cells always occupy, were found to be inapplicable to the determination of the white cell count. For all of the above reasons it became necessary to design a new method and apparatus for determining the white cell count.

It is an object of the present invention, therefore, to provide an apparatus for rapidly and accurately determining the number of white cells present in a blood sample, without involving the complicated and prolonged analysis of the prior art.

Another object is to provide a simple method capable of being used by a person with relatively little training.

A further object is to provide a portable device capable of being used in the most remote locations under the most adverse conditions to determine the number of white cells present.

A further object is to provide a device capable of being easily yet accurately manufactured.

The invention, together with its objects and advantages, will be best understood by reading the following detailed description with reference to the accompanying drawings in which is illustrated a presently preferred embodiment of the invention, and wherein:

FIG. 1 is a front elevation view of the present invention;

FIG. 2 is a top plan view of the present invention;

FIG. 3 is an enlarged section of the apparatus, showing in detail the area surrounding the pointer and the white cell layer in the test tube of FIG. 1.

In general, the apparatus of the present invention comprises the interaction of a means for receiving a blood sample in a column of predetermined transverse area and volume in which the white cells have been separated into a layer on the top of the blood sample.

Further means are provided for measuring the magnitude of the thickness of the separated white cell layer. To this latter means a mechanical multiplying linkage acts in response to the operation of the measuring means to multiply the measurement of the thickness. Thereupon a translating means is provided to translate the multiplied measured thickness into the number of cells per unit of volume. This latter means includes a scale which is intersected by the multiplying linkage and is calibrated with indicia adapted to define the intersection of the multiplying linkage and the scale in terms of the number of cells per unit of volume.

Referring now in greater detail to the drawings the device of the present invention, as shown by FIG. 1, comprises a base 10 on which is mounted a fixed reference line 11 and a magnifying glass 12 of approximately 10× magnification. The fixed reference line can be made of a clear plastic material machined with sufficient accuracy to be aligned with the lower surface of the separated white cell layer of the blood sample. The blood sample itself has been placed within the test tube 24, of predetermined bore, which serves as a means for receiving the separated white blood sample. The reference line 11 also serves as a holder for the test tube 24 in that the clearance for the test tube is sufficient to loosely retain the tube when placed within the device. The holder is mounted by screws to the base 10. A retaining spring 25 is also placed upon the base to further assist in holding the test tube in place. This operation of the spring can be shown to advantage by FIG. 2.

Further mounted upon the base is a linkage assembly, which serves as a means for measuring the magnitude of the thickness of the separated white cell layer and multiplying the measured magnitude of the thickness of the white cell layer. The linkage assembly is made up of first rod 13, second rod 14, first linkage member 15 and second linkage member 16. The first rod 13 has at its one end a pointer surface 16′ which is precisely machined to be aligned with the upper surface of the separated white cell layer. To allow movement of the pointer 16′ the first rod 13 is pivotally mounted to the base at point 17. The pivot point 17 being located near one end portion of rod 13 provides a mechanical multiplication so that a slight movement of pointer edge 16′ will provide a larger movement at the other end of the first rod 13. This thereby provides a multiplication at the other end of rod 13 of any movement of the pointer 16′. The end of the first rod 13 is linked to an end of the second rod 14 by means of the two linkage members, 15 and 16. The first linkage member 15, is pivotally fixed to the base at point 20 and pivotally fastened to second rod 14 at point 19 after passing over the first rod 13. Second linkage member 16, is linked to the first rod 13 at point 21 and the second rod 14 at point 18.

An empirical scale 23, acts in cooperation with second rod 14 to respond to the operation of the multiplication means and translates the multiplied measured thickness into the number of cells per unit of volume. The empirical scale 23 carries out the foregoing by indicating the number of white cells per unit of volume at the intersection between second rod 14 and the scale 23. The second rod 14 has a magnifying glass 22, of approximately 2× magnification for viewing the reading at the intersection of the second rod 14 and the scale 23. The scale 23 has had its values obtained and verified by utilizing the prior art system of physically counting the cells and correlating this to the physical thickness of the separated white cell layer on a trial and error basis.

OPERATION

Thus to determine a blood count the operator places the centrifuged blood sample of predetermined volume, contained within the test tube of predetermined bore 24 within the holder 11 and retaining spring 25. The lower level of the separated white cells 27 is aligned with the reference line 11. The pointer edge 16′ is, as shown to advantage in FIG. 3, now aligned with the upper edge 26 of the separated white cell layer. The distance between the upper and lower cell layers is transmitted and multiplied through the first rod 13 and the linkage member 15 and 16 to the second rod 14. This transmission and multiplication produces a deflection in the rod 14 creating a point of intersection with the scale 23. This intersection upon the scale indicates directly the number of white cells per cubic millimeter in the blood sample. The reading i.e. the point of intersection between second rod 14 and the scale 23 can be precisely examined under the magnifying glass 22 for greater accuracy.

By means of the present device, and the method indicated above, we have obtained highly accurate readings, useful to the medical profession. The accuracy and speed of these readings enables treatment of disease to take place within a short period of time after the taking of a blood sample from the patient. Further the simplicity of design and operation has enabled us to instruct relatively unskilled personnel in its operation without losing accuracy.

While the device of the present invention has been described and illustrated as relating to the analysis of blood specimens, it is to be understood that the principle here employed is adaptable to many other applications, wherein the determination of count per unit volume is required. Further, while one particular embodiment has been chosen to illustrate the invention, it is not to be regarded as the only embodiment possible. Only such limitations are to be imposed thereon as may reasonably come within the scope of the appended claims.

What we claim is:

1. An apparatus for determining the number of white cells per unit of volume comprising: means for receiving a sample of blood in a column of predetermined transverse area and volume, in which the white cells have been separated into a layer; means for measuring the thickness of the separated white cell layer; a linkage assembly for multiplying the measured thickness, the linkage assembly comprised of a first rod, the first rod pivoted at a point adjacent to one end of the first rod, a fixed pointer for mounting on the one end of said first rod, a second rod, the second rod lying in proximity to the first rod, a first and second linkage member, the first rod joined at a point adjacent to the other end of the first rod by the first linkage member, the second linkage member pivotally fastened to the base, said second linkage member extending adjacent said first rod, said second linkage member pivotally and transversely joined at its other end to the second rod, said first and second linkage members acting to produce a movement in the second rod in response to movement at the one end of the first rod, means for translating the multiplied measured thickness into the actual number of cells per unit of volume having a scale which has been calibrated to indicate at the intersection of the multiplying linkage assembly and the scale the number of cells per unit of volume.

2. Apparatus for determining the number of white cells per unit of volume in a blood sample of predetermined volume the white cells of which have been separated into a layer in a test tube of predetermined inside diameter, the apparatus comprising:

a base, a test tube receptacle mounted on the base, a reference indicia fixedly disposed upon said base, the lower edge of the separated white cell layer being aligned with said reference line when the test tube is placed adjacent said base, a first and a second rod placed in juxtaposition to each other, a pointer mounted at one end of the first rod adapted to be aligned adjacent to the upper edge of the separated white cell layer, said first rod pivotally mounted to said base at a point adjacent to said pointer end, the pivotal mount being located to provide a shorter section of the first rod extending toward the pointer end and a longer section extending toward the opposite end of the first rod, a first linkage member being pivotally and transversely joined at one end thereof to the long section of the first rod and being pivotally and transversely joined at the other end thereof to the second rod at a point adjacent to one end of the second rod, a second linkage member pivotally fastened to the base, the second linkage member extending adjacent to the first rod and being pivotally and transversely joined to the second rod at a point adjacent to the point at which the first linkage member is fastened to the second rod, the first and second linkage members acting to provide movement in the second rod in response to the movement of the first rod when the pointer is moved through the distance between the upper and lower edges of the white cell layer, and a scale disposed for intersecting the path of travel of the second rod for indicating at the intersection thereof the number of white cells per unit of volume of the blood sample whereby the scale in response to the movement of the pointer is adapted to indicate the number of cells per unit of volume in a blood sample.

References Cited

UNITED STATES PATENTS

| | | | |
|---|---|---|---|
| 1,424,429 | 8/1922 | Wagner et al. | 33—143 |
| 2,104,525 | 1/1938 | Proskouriakoff | 88—14 |
| 2,840,915 | 7/1958 | Drummond | 33—143 |
| 3,153,288 | 10/1964 | Abel | 33—174 |

OTHER REFERENCES

Lapin, J. and Horonick, A.: Ambeoid Motility of Human Leukocytes. Blood, The J. of Hematology, 11:225–226, January-June 1956.

RONALD L. WIBERT, *Primary Examiner.*

T. MOHR, *Assistant Examiner.*

U.S. Cl. X.R.

356—39